United States Patent [19]

Pohl

[11] Patent Number: 5,142,368
[45] Date of Patent: Aug. 25, 1992

[54] METHOD AND APPARATUS FOR CHANGING THE POSITION OF A DIGITALLY GENERATED TELEVISION SPECIAL EFFECT BOUNDARY

[75] Inventor: Winfried Pohl, Büttelborn, Fed. Rep. of Germany

[73] Assignee: BTS Broadcast Television Systems GmbH, Darmstadt, Fed. Rep. of Germany

[21] Appl. No.: 586,811

[22] Filed: Sep. 24, 1990

[30] Foreign Application Priority Data

Oct. 25, 1989 [DE] Fed. Rep. of Germany ....... 3935447

[51] Int. Cl.$^5$ ............................................ H04N 5/272
[52] U.S. Cl. ...................................... 358/183; 358/22
[58] Field of Search ................. 358/183, 182, 22, 181, 358/166; 340/791, 792

[56] References Cited

U.S. PATENT DOCUMENTS

| 4,199,788 | 4/1980 | Tsujimura | 358/183 |
| 4,287,534 | 9/1981 | Pohl | 358/183 |
| 4,356,511 | 10/1982 | Tsujimura | 358/181 |
| 4,782,391 | 11/1988 | McMeely et al. | 358/183 |
| 4,833,538 | 5/1989 | Heida | 358/183 |
| 4,860,630 | 7/1989 | Field | 358/22 |

Primary Examiner—Howard W. Britton
Assistant Examiner—Jeffrey S. Murrell
Attorney, Agent, or Firm—Frishauf, Holtz, Goodman & Woodward

[57] ABSTRACT

In the generation of a digital special effect boundary signal for mixing or fading television signals with a wipe movement, the boundary position is determined by the state of a counter controlled by a clock pulse oscillator coupled to the line frequency. In order to prevent a visible staircase effect on the moving boundary, a progressive phase shifting of the clock signal for clocking the counter is provided by a control signal derived from the digital data of the special effect boundary signal. For that purpose a variable delay line is interposed ahead of the clock input of the counter and the delay is controlled, line by line, by a digital ramp signal processed in a multiplier and other stages. The counter is loaded with data supplied during the horizontal blanking interval from another output of the digital multiplier.

8 Claims, 2 Drawing Sheets

METHOD AND APPARATUS FOR CHANGING THE POSITION OF A DIGITALLY GENERATED TELEVISION SPECIAL EFFECT BOUNDARY

This invention concerns the provision of a wipe movement of a boundary between two pictures simultaneously displayed during a transition from one scene to another on a television screen, by means of control signals that are digital rather than analog.

In an analog generator of the special effect boundary used in connection with a television mixer to provide a wipe transition, the horizontal position of the special effect outline or boundary can be controlled to any desired degree of precision, because all the signals needed for the operation are derived from sawtooth signals rising or falling linearly with respect to time. A known method for analog generation of control signals for special effect fading from one video signal into another is described, for example, in U.S. Pat. No. 4,287,534. The boundary of the special effect pattern in that case can thus be shifted in a stepless by analog means. Differences from line to line in the special effect boundary position produce a so-called edge modulation which is preferably utilized in certain video fading procedures. The special effect boundary can be changed by means of a vertical frequency sawtooth signal in such a way that this boundary can be shifted, e.g. from line to line by a difference of only a few nanoseconds, so that a boundary line results without visible step formation.

In the case of digital special effect boundary signal generation, the special effect boundary position is determined by the state of a counter which is controlled by a clock pulse oscillator coupled to the line frequency. Since the counter state changes only with the active flank of a clock pulse, the special effect boundary in any line can lie only at a position corresponding to a multiple of the clock period. This quantization blocks out at special effect boundary modulation at small amplitude in such a way that for several lines in succession no change of position of the boundary takes place, so that a coarsely stepped staircase is produced as the modulation edge, which of course produces a considerably disturbing effect.

SUMMARY OF THE INVENTION

It is object of the present invention to provide a method and apparatus for shifting the special effect boundary in a wipe movement on a digital basis which avoids the above-noted disturbing coarse step appearance of digitally generated edge modulation when a wipe movement is produced.

Briefly, a control signal is derived from the digital data of the edge modulation in the special effect boundary signal for producing progressive phase shifting of the clock signal for clocking the counter that determines the special effect boundary position.

The invention has the advantage that quantization jumps are avoided by phase modulation of the clock signal as a result or an interpolation procedure for modulation and positioning of the special effect boundary In addition, the special effect pattern has better resolution during positioning It is particularly convenient for the phase shift of the clock signal from line to line to be produced by successive delays of equal fractions of a clock pulse period. It is also convenient to load the digital data of the special effect boundary signal into the counter only during the horizontal blanking interval.

BRIEF DESCRIPTION OF THE DRAWINGS

Further details of the method, and especially of the apparatus, of the invention will now be explained by way of illustrative example with reference to the annexed drawings, in which.

DESCRIPTION OF THE ILLUSTRATED EMBODIMENT AND METHOD

Figure 1:
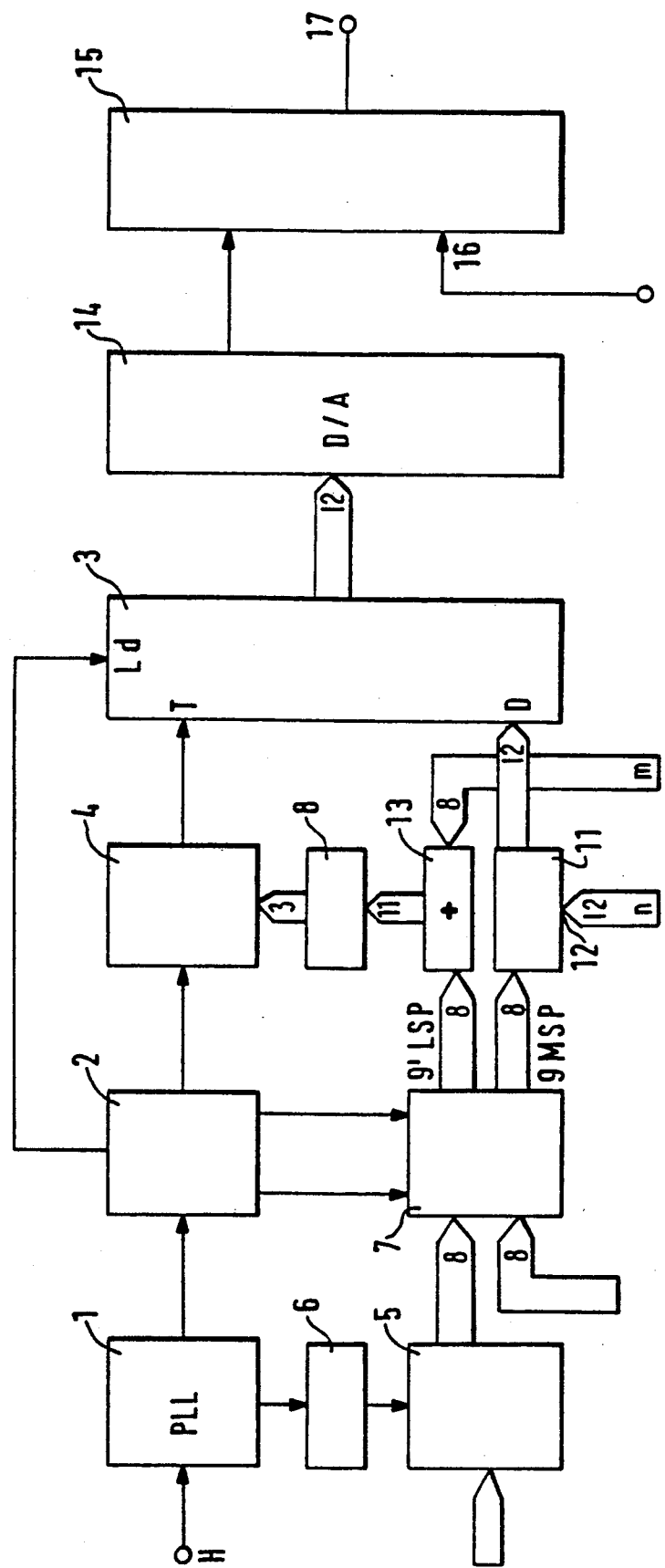
FIG. 1 is a circuit block diagram of apparatus for carrying out the method of the invention.
Figure 2:
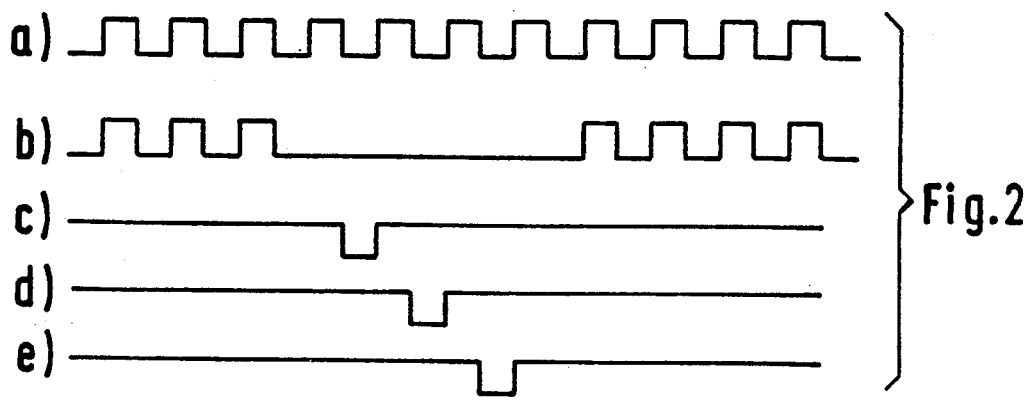
FIG. 2 is a collection of graphs drawn to the same time scale showing pulses appearing in the system of FIG. 1.

The circuit block diagram of FIG. 1 shows a phase-locked clock pulse oscillator 1 to which a horizontal frequency pulse signal H is supplied, as a result of which the oscillator 1 is locked to the line frequency of a television system. The clock signal supplied by the clock pulse oscillator 1 to a following gate circuit 2 is illustrated in line (a) of FIG. 2 and has a period duration that is preferably less than 60 nanoseconds. The gate circuit 2 generates a load pulse shown as (c) in FIG. 2, during the horizontal blanking interval, which is supplied to a programmable counter 3 at its input Ld. This load pulse blocks the further supply of the clock signal for at least two clock pulse periods as shown at (d) in FIG. 2. By means of the load pulse (c) the data input D of the counter 3 of FIG. 1 is loaded with the data word then present.

The clock signal output of the gate 2 is connected, in accordance with the invention, through a controllable digital delay line 4 to the clock input T of the counter 3. By means of the control of this delay line 4 as further described below it is possible to shift the clock signal by a fraction of the clock pulse period so that a corresponding position change of the special effect boundary from line to line is possible.

A PROM 5, which serves as a modulation signal generator stores several different curves which are selectable one at a time by means of data from a computer not shown in the drawing. The modulation signal generator 5 is for this purpose clocked by the clock pulse oscillator 1 through a frequency divider 6 with clock pulses having a frequency in the range from about 32 kHz to 16 kHz. The output signal of the modulation signal generator 5 containing the data of the selected curve or ramp signal, which is 8 bits wide, is now supplied to a digital multiplier 7 having a second input for a modulation amplitude signal likewise 8 bits wide, by which the magnitude of the boundary modulation can be set. The multiplier 7 receives a load pulse shown at (d) in FIG. 2 from the gate 2 during each horizontal blanking interval for loading the data and an unload pulse shown in FIG. 2 at (e) for the further transmission of the data.

The product of each multiplication is available at the outputs of the multiplier 7, the outputs 9 providing the more significant product (MSP) and the outputs 9' the less significant product (LSP). When a vertical frequency ramp signal serves as the input curve signal for the multiplier 7, the so-called more significant product MSP produces a vertical frequency staircase signal with large steps and the so-called LSP produces a vertical frequency staircase signal with small steps. The conversion of both the MSP and the LSP into respective 8 bit signals is performed in the multiplier 7. The LSP contains boundary change information for every line. This information lies between two start addresses for the counter 3.

Since the counter 3 does not carry out any data changes the clock pulse is shifted by means of the information from the LSP, in accordance with the invention, before the clock pulse flank which activates the counter (start address). For that purpose the LSP is supplied to the control input of the delay line 4, by means of which the clock signal can take on intermediate timing between two successive unmodified clock pulses. Only three more significant bits from the LSP are used for the delay control, since the 7.5 ns quantization thus produced is sufficiently small: that amount of quantization is too small to be resolved in a normal monitor, with the effect that the modulation boundary thus generated is practically the same as is produced by analog modulation. By means of the delay line 4 the clock pulse blocking region is also shifted in time, so that in no case would a clocking pulse get into the loading operation of the counter 3.

Since the special effect boundary appears progressively earlier with increasing start addresses, it is necessary for the intermediate timing data which are formed by means of the delay line 4, to provide shorter and shorter delays corresponding to greater and greater programming numbers. Since in operation of such delay lines the delay values are in general proportional to the controlling digital signal, this requirement can be met by first inverting the control signal by means of an inverter stage 8. In that way the small numbers will relate to a great delay and the large numbers to a small delay. When the LSP control word is complemented over all of its m=8 bits in the addition stage, in the LSP region of the positioning data, it is then possible, by means of the phase modulation of the clock pulses to increase the resolution by the factor 2m without change of the clock frequency.

The data of the MSP are supplied to the inputs of a digital addition stage 11, which has an additional input 12 to which the positioning data for the position change of the special effect boundary is supplied by a suitable automatic or manual setting circuit or device. The positioning data at the input 12 are entered with a width of n=12 bits, so that the smallest time shift is equal to the reciprocal of the clock pulse frequency. In the addition stage 11 these data are added and then transmitted further for setting the start address by means of 12 bits at the input D of the counter 3.

The outputs of the counter 3 are connected with corresponding inputs of a 12-bit digital to analog converter 14, which produces a sawtooth signal of horizontal frequency by converting the counter information. This signal is then supplied to a comparator 15, where it is compared with a reference voltage supplied at another input 16. The reference voltage is derived from a fading lever for the changing of the special effect boundary position in the fading the video signals The comparator output 17 provides the signal for the special effect boundary.

Figure 3A:
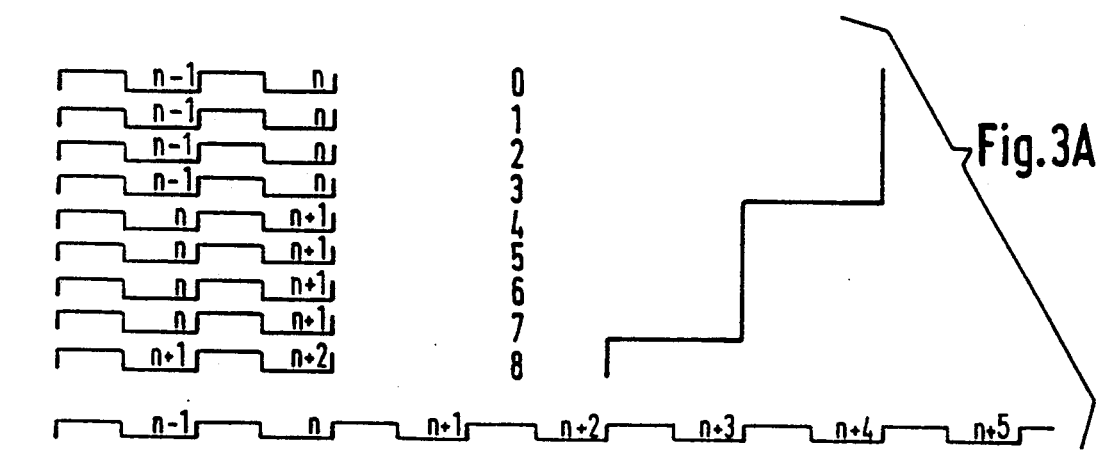
FIG. 3A is a representation of the relation of clock pulse phase to special effect boundary for a case in which the method of the invention is not used, the illustration being partially in tabular and partially in graphical form.
Figure 3B:
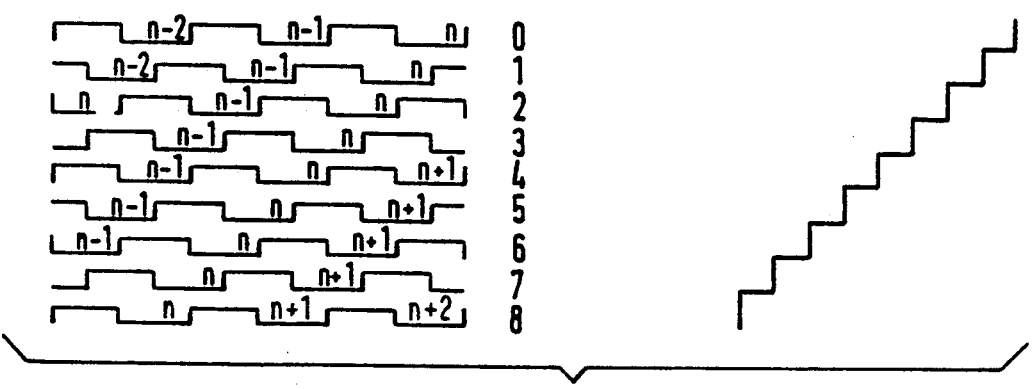
FIG. 3B is an illustration of the relation between clock pulse phase and special effect boundary, likewise in partially tabular and partially graphical form, for the case in which the method of the invention is used.
Figure 1:
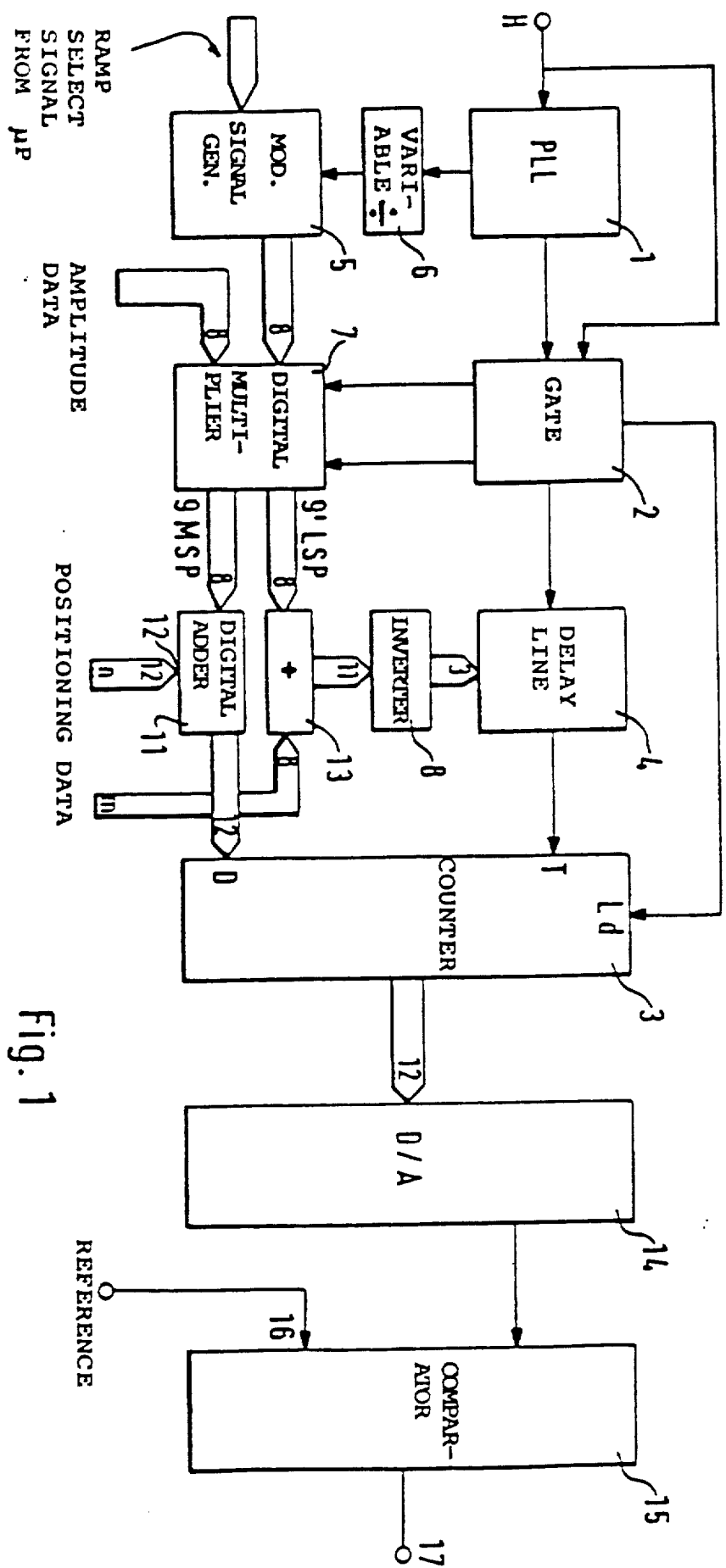

FIG. 3A and FIG. 3B respectively represent a picture region containing a generated special effect boundary and the related pulse signals in the horizontal blanking interval for lines 0 to 8, inclusive, FIG. 3A showing this for the case in which the invention is not used and FIG. 3B for the case in which interpolation by means of the delay line 4 is used in accordance with the invention. The bottom line of FIG. 3A shows the clock pulses used in both FIG. 3A and FIG. 3B on the time scale of the left hand portions of FIG. 3A and FIG. 3B.

As can be readily recognized, the special effect boundary in FIG. 3A is coarsely stepped, because as a result of the clock signals reaching the counter 3 unchanged in lines 0, 1, 2 and 3, there is no boundary shift in those lines, whereas the boundary in lines 4 to 7 are all shifted by just a full clock period in contrast thereto.

When interpolation in accordance with the invention is used, a finer stepping of the special effect boundary is obtainable as shown in FIG. 3B. As there shown, in line 0, with the start address n and the interpolation value 0 a full period delay is in effect, since by the inversion of the LSP to the value 0 the greatest delay is provided. In line 1, with the unchanged start address the delay is reduced to ¾ of the maximum delay, i.e. the pulse edge n arrives ¼ period earlier, and likewise also the special effect boundary. In lines 2 and 3, the start address remains n and the delay is further reduced. In line 4 the start address has been raised by one, the interpolation number is 0, therefore maximum delay, the pulse edge n arrives exactly one period earlier than in line 0 The same sequence of events repeats in the following lines. The pulse plan of FIG. 3B shows that the pulse flank n arrives earlier by ¼ of a pulse period from line to line, which produces a corresponding special effect boundary shift.

It is evident from the comparison of the pulse patterns of FIG. 3B and FIG. 3A, respectively with and without interpolation, that the interpolation produced by the delay line 4 has the result that the entire special effect boundary appears later by one clock pulse period compared to the case without interpolation.

Although the invention has been described with reference to a variations and modifications are possible within the inventive concept.

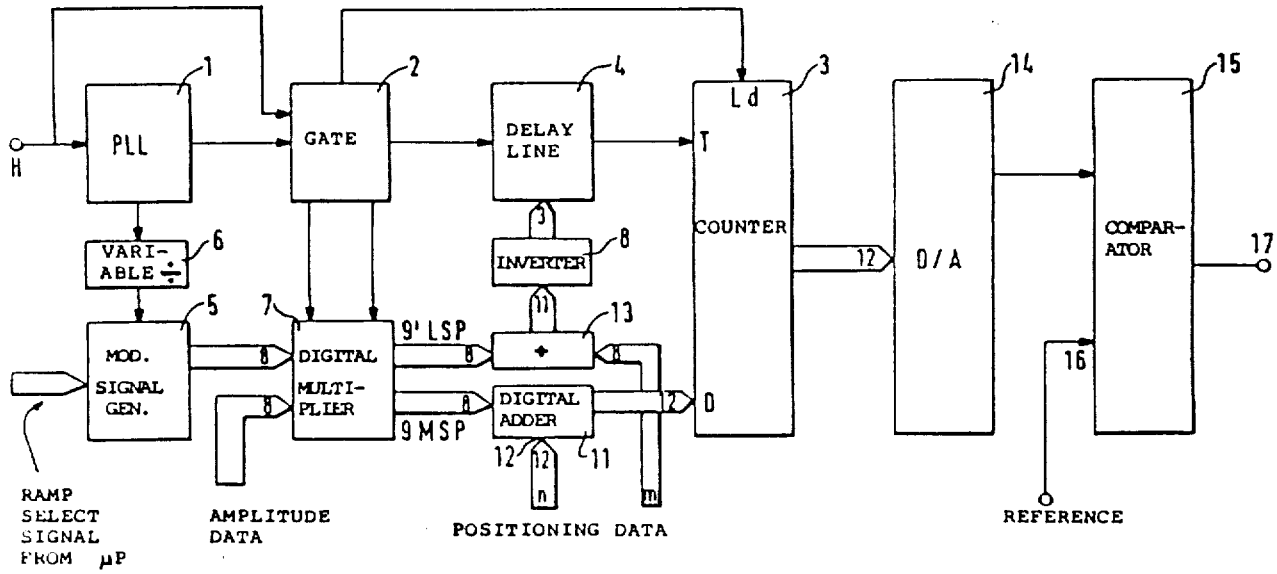

I claim:

1. A method of shifting the position of a digitally generated special effect boundary pattern with edge modulation by changing the state of a programmable ramp counter clocked by a clock signal locked to a line scanning frequency for mixing or fading of video signals, comprising the steps of:

producing a less significant product of digital data of said edge modulation which includes the least significant bit thereof and a selectable amplitude for said edge modulation;

deriving, from said less significant product, a control signal for line by line progressive phase shifting of said clock signals, and clocking said counter with said phase shifted clock signal.

2. The method of claim 1, wherein only a few of the significant bits of said least significant product are used for said control signal.

3. The method of claim 1, wherein said control signal is proportional to a value obtained by inverting said least significant product of said digital data, 4. The method of claim 1, wherein by means of said control signal a line by line progressive phase shift of said clock signal is produced to which each step of phase shift is equal to the same fraction of a clock pulse period of said clock pulses.

5. A method of shifting the position of a digitally generated special effect boundary pattern with edge modulation by changing the state of a programmable ramp counter clocked by a clock signal locked to a line scanning frequency for mixing or fading of video signals, comprising the steps of:

deriving from the digital data of said edge modulation a control signal for line by line progressive phase shifting of said clock signal, clocking said counter with said phase shifted clock signals, and loading said digital data into said counter only during a horizontal blanking interval.

6. Apparatus for shifting the position of a digitally generated special effect boundary pattern for television wipe-mixing, comprising:

a clock pulse oscillator (1) connected in a phase locked loop circuit (PLL) for locking the frequency of said oscillator to pulses of a television horizontal frequency supplied at an input of said phase locked loop circuit;

gate circuit means, (2), having inputs connected to a clock pulse output of said oscillator and to a television horizontal synchronizing signal, for providing first, second and third output pulses at respective outputs during horizontal blanking intervals and providing clock pulses at a fourth output in continuous sequences except during intervals briefly preceding and following said first, second and third output pulses;

a controllably variable digital delay line having an output, a first input connected to said fourth output of said gate circuit means (2) and a second input which is a delay control input;

a boundary shift-control counter (3) having an output, a count pulse input (T) connected to the output of said delay line, a data input (D) and a load pulse input (Ld) for timing the loading of said counter with data supplied at said data input, said load pulse input being connected to said first output of said gate circuit means;

a ramp signal generator (5) having an output and means including a frequency divider (6) for synchronizing its output with said oscillator;

a digital multiplier (7) having a first data input connected to said output of said ramp signal generator (5) and a second data input connected to a source of selectable amplitude data for producing at a first output (9') a less significant product (LSP) including the least significant product (MSP) including the most significant product bit and excluding the bits of said less significant product;

an inverter stage (8) having an input connected to a source of a derived from said first (LSP) output (9') of said multiplier (7) and an output connected to said control input of said delay line (4):

a digital addition state (11) having one input connected to said second (MSP) output (9) of said digital multiplier (7), a second input connected to a source of externally controllable positioning data and an output connected to said data input (D) of said counter (7);

a digital-to-analog converter (14) having an input connected to said output of said counter (3) and having an output, a comparator (15) having an output, a first input connected to said output of said digital-to-analog converter (14) and a second input connected to a source of externally controllable fading control data, said comparator output being a source of a special effect boundary pattern control signal.

7. The apparatus of claim 6, wherein those output of gate circuit means for said second and third output pulses are connected for respectively loading and unloading said digital multiplier (7).

8. The apparatus of claim 6, wherein said ramp signal generator includes means for storing various selectable ramp signals and means for selecting one of said selectable ramp signals for supply to said multiplier under control of a computer external to said apparatus.

* * * * *

UNITED STATES PATENT AND TRADEMARK OFFICE
CERTIFICATE OF CORRECTION

PATENT NO. : 5,142,368

DATED : AUGUST 25, 1992

INVENTOR(S) : WINFRIED POHL

It is certified that error appears in the above-identified patent and that said Letters Patent is hereby corrected as shown below:

In Section [56] References Cited, right column,
the issue date of U.S. Patent No. 4,860,630 (Field)
should be -- 7/1987 -- instead of "7/1989"; and The title page should be deleted to appear as per attached title page.

Figure 1 should be deleted to appear as shown on attached sheet.

Signed and Sealed this

Twenty-sixth Day of October, 1993

Attest:

BRUCE LEHMAN

Attesting Officer

Commissioner of Patents and Trademarks

United States Patent [19]

Pohl

[11] Patent Number: 5,142,368
[45] Date of Patent: Aug. 25, 1992

[54] METHOD AND APPARATUS FOR CHANGING THE POSITION OF A DIGITALLY GENERATED TELEVISION SPECIAL EFFECT BOUNDARY

[75] Inventor: Winfried Pohl, Büttelborn, Fed. Rep. of Germany

[73] Assignee: BTS Broadcast Television Systems GmbH, Darmstadt, Fed. Rep. of Germany

[21] Appl. No.: 586,811

[22] Filed: Sep. 24, 1990

[30] Foreign Application Priority Data

Oct. 25, 1989 [DE] Fed. Rep. of Germany ....... 3935447

[51] Int. Cl.⁵ .............................................. H04N 5/272
[52] U.S. Cl. ................................. 358/183; 358/22
[58] Field of Search ................. 358/183, 182, 22, 181, 358/166; 340/791, 792

[56] References Cited

U.S. PATENT DOCUMENTS

| | | | |
|---|---|---|---|
| 4,199,788 | 4/1980 | Tsujimura | 358/183 |
| 4,287,534 | 9/1981 | Pohl | 358/183 |
| 4,356,511 | 10/1982 | Tsujimura | 358/181 |
| 4,782,391 | 11/1988 | McMeely et al. | 358/183 |
| 4,833,538 | 5/1989 | Heida | 358/183 |
| 4,860,630 | 7/1989 | Field | 358/22 |

Primary Examiner—Howard W. Britton
Assistant Examiner—Jeffrey S. Murrell
Attorney, Agent, or Firm—Frishauf, Holtz, Goodman & Woodward

[57] ABSTRACT

In the generation of a digital special effect boundary signal for mixing or fading television signals with a wipe movement, the boundary position is determined by the state of a counter controlled by a clock pulse oscillator coupled to the line frequency. In order to prevent a visible staircase effect on the moving boundary, a progressive phase shifting of the clock signal for clocking the counter is provided by a control signal derived from the digital data of the special effect boundary signal. For that purpose a variable delay line is interposed ahead of the clock input of the counter and the delay is controlled, line by line, by a digital ramp signal processed in a multiplier and other stages. The counter is loaded with data supplied during the horizontal blanking interval from another output of the digital multiplier.

8 Claims, 2 Drawing Sheets